US010989648B2

(12) United States Patent
Blandin et al.

(10) Patent No.: US 10,989,648 B2
(45) Date of Patent: Apr. 27, 2021

(54) METHOD FOR FORMING A HIGH RESOLUTION IMAGE BY LENSLESS IMAGING

(71) Applicant: COMMISSARIAT A L'ENERGIE ATOMIQUE ET AUX ENERGIES ALTERNATIVES, Paris (FR)

(72) Inventors: Pierre Blandin, Coublevie (FR); Thomas Bordy, Grenoble (FR); Olivier Cioni, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/463,262

(22) PCT Filed: Nov. 22, 2017

(86) PCT No.: PCT/FR2017/053214
§ 371 (c)(1),
(2) Date: May 22, 2019

(87) PCT Pub. No.: WO2018/096269
PCT Pub. Date: May 31, 2018

(65) Prior Publication Data
US 2019/0293544 A1 Sep. 26, 2019

(30) Foreign Application Priority Data
Nov. 24, 2016 (FR) ........................................ 1661429

(51) Int. Cl.
*G01N 15/14* (2006.01)
*G03H 1/08* (2006.01)
(Continued)

(52) U.S. Cl.
CPC ....... *G01N 15/1434* (2013.01); *G03H 1/0443* (2013.01); *G03H 1/0866* (2013.01);
(Continued)

(58) Field of Classification Search
CPC .............. G06T 3/4053; G01N 15/1434; G01N 2015/1006; G01N 2015/1454;
(Continued)

(56) References Cited

U.S. PATENT DOCUMENTS 8,866,063 B2 10/2014 Ozcan et al.
9,715,099 B2 * 7/2017 Ozcan .................. G06T 3/0068
(Continued)

FOREIGN PATENT DOCUMENTS

WO   WO 2010/138822 A1   12/2010
WO   WO 2014/071962 A1   5/2014
WO   WO 2018/096269 A1   5/2018

OTHER PUBLICATIONS

International Search Report dated Mar. 5, 2018 in PCT/FR2017/053214 filed on Nov. 22, 2017.
(Continued)

*Primary Examiner* — Neil R Mikeska
(74) *Attorney, Agent, or Firm* — Oblon, McClelland, Maier & Neustadt, L.L.P.

(57) ABSTRACT

A device and method for forming an image of a sample includes illuminating the sample with a light source; acquiring a plurality of images of the sample using an image sensor, the sample being placed between the light source and the image sensor, no magnifying optics being placed between the sample and the image sensor, the image sensor lying in a detection plane, the image sensor being moved with respect to the sample between two respective acquisitions, such that each acquired image is respectively associated with a position of the image sensor in the detection
(Continued)

plane, each position being different from the next; and forming an image, called the high-resolution image, from the images thus acquired.

9 Claims, 7 Drawing Sheets

(51) Int. Cl.
G06T 3/40 (2006.01)
H04N 5/225 (2006.01)
G03H 1/04 (2006.01)
G03H 1/26 (2006.01)
G01N 15/00 (2006.01)
G01N 15/10 (2006.01)

(52) U.S. Cl.
CPC ......... *G06T 3/4053* (2013.01); *H04N 5/2253* (2013.01); *H04N 5/2254* (2013.01); *H04N 5/2256* (2013.01); *G01N 2015/008* (2013.01); *G01N 2015/0038* (2013.01); *G01N 2015/1006* (2013.01); *G01N 2015/144* (2013.01); *G01N 2015/1454* (2013.01); *G03H 2001/0447* (2013.01); *G03H 2001/0883* (2013.01); *G03H 2001/2655* (2013.01); *G03H 2227/03* (2013.01); *G03H 2240/56* (2013.01); *G03H 2240/62* (2013.01)

(58) Field of Classification Search
CPC ..... G01N 2015/0038; G01N 2015/144; G03H 1/0443; G03H 1/0866; G03H 2001/0883; G03H 2227/03; G03H 2240/62; G03H 2240/56; G03H 2001/0447; G03H 2001/2655; H04N 5/2254; H04N 5/2256; H04N 5/2253
See application file for complete search history.

(56) References Cited

U.S. PATENT DOCUMENTS

| 10,261,298 | B1* | 4/2019 | Hong ................ G02B 21/0032 |
| 2012/0248292 | A1 | 10/2012 | Ozcan et al. |
| 2015/0358564 | A1* | 12/2015 | Kang .................. H04N 5/2252 |
| | | | 348/244 |
| 2016/0320602 | A1* | 11/2016 | Kazemzadeh ....... G03H 1/0443 |
| 2016/0334614 | A1 | 11/2016 | Ozcan et al. |

OTHER PUBLICATIONS

Zhang, Y. et al., "Color calibration and fusion of lens-free and mobile-phone microscopy images for high-resolution and accurate color reproduction," Scientific Reports, 6:27811, DOI: 10.1038/srep27811, Jun. 2016, pp. 1-14.

Greenbaum, A. et al., "Maskless imaging of dense samples using pixel super-resolution based multi-height lensfree on-chip microscopy," Optics Express, vol. 20, No. 3, Jan. 2012, pp. 3129-3143.

Kornis, J. et al., "Application of super image methods in digital holography," Optical Measurement Systems for Industrial Inspection IV, Proc. of SPIE, vol. 5856, 2005, pp. 245-253.

Di, J. et al., "High resolution digital holographic microscopy with a wide field of view based on a synthetic aperture technique and use of linear CCD scanning," Applied Optics, vol. 47, No. 30, Oct. 2008, pp. 5654-5659.

Kreis, T. et al., "Resolution enhancement by aperture synthesis in digital holography," Optical Engineering, vol. 46(5), May 2007, pp. 055803-1-055803-7.

* cited by examiner

METHOD FOR FORMING A HIGH RESOLUTION IMAGE BY LENSLESS IMAGING

TECHNICAL FIELD

The invention belongs to the technical field of lensless imaging, for the observation of samples, in particular biological samples. Lensless imaging consists in observing a sample placed between a light source and an image sensor, the sample being placed in proximity to the image sensor, without any magnifying optics between the sensor and the sample.

PRIOR ART

The observation of samples, and in particular biological samples, by lensless imaging has seen substantial development over the last 10 years. This technique allows a sample to be observed by placing it between a light source and an image sensor, without placing any magnifying optical lenses between the sample and the sensor. Thus, the image sensor collects an image of the light wave transmitted by the sample.

This image is formed from interference patterns generated by interference between the light wave emitted by the source and transmitted without diffraction by the sample, and diffracted waves resulting from the diffraction, by the sample, of the light wave emitted by the source. These interference patterns are sometimes called diffraction patterns, or holograms.

Document WO2008090330 describes a device allowing biological samples, in fact cells, to be observed by lensless imaging. The device makes it possible to associate, with each cell, one interference pattern, the morphology of which allows the type of cell to be identified. Lensless imaging would therefore appear to be a simple and inexpensive alternative to a conventional microscope. In addition, its field of observation is clearly larger than it is possible for that of a microscope to be. It will thus be understood that the perspective applications of this technology are many and important.

The image formed on the image sensor, which contains interference patterns, may be processed by a numerical propagation algorithm, so as to estimate the optical properties of the sample. Such algorithms are well known in the field of holographic reconstruction. To do this, the distance between the sample and the image sensor being known, a propagation algorithm, taking into account this distance, and the wavelength, is applied. It is thus possible to reconstruct an image of an optical property of the sample. One numerical reconstruction algorithm is for example described in US2012/0218379.

U.S. Pat. No. 8,866,063, by the same author as the aforementioned patent application, describes a method allowing the spatial resolution of images obtained by lensless imaging to be improved. To do this, the sample and the image sensor remaining stationary, a plurality of images are acquired such that between each image, the light source is offset slightly. An image-processing algorithm then allows an image, of improved resolution, to be formed by combining the images thus acquired. A method for improving the spatial resolution of an image is also described in US2016/334614.

The inventors have identified an alternative solution, allowing the spatial resolution of images obtained by lensless imaging to be improved, using a simple and inexpensive device.

SUMMARY OF THE INVENTION

One subject of the invention is a method for forming an image of a sample comprising the following steps:
a) illuminating the sample with a light source;
b) acquiring a plurality of images of the sample using an image sensor, the sample being placed between the light source and the image sensor, such that:
   the sample is immobile with respect to the light source;
   no magnifying optics are placed between the sample and the image sensor;
   the image sensor lies in a detection plane, the image sensor being moved, in the detection plane, between two successive acquisitions;
   each acquired image is respectively associated with a position of the image sensor in the detection plane, each position being different from the next;
c) calculating a movement of each acquired image with respect to a reference image in which the image sensor occupies a reference position;
d) forming an image, called the high-resolution image, from the acquired images and the movement calculated for each thereof.

According to one embodiment, each acquired image contains pixels, and the high-resolution image contains more pixels than each acquired image.

Thus, contrary to the prior art, the sample remains stationary with respect to the light source. The light wave reaching the detection plane is therefore identical during each image acquisition. The image sensor forms a different image of this light wave in each acquisition.

The method may comprise one of the following features, whether singly or in any technically possible combination:
- the image sensor is securely fastened to a piezoelectric transducer, the movement of the position of said image sensor being generated by activation of said piezoelectric transducer;
- the movement of the image sensor between two successive positions is random;
- each acquired image containing a plurality of pixels, the maximum value of the movement between two successive images is 5 times or 10 times the distance between two adjacent pixels. This allows the useful field of observation to be maximized, the latter corresponding to the intersection of the fields of observation of each acquired image;
- the sample contains diffracting elements, each image acquired by the image sensor containing elementary diffraction patterns, each elementary diffraction pattern being associated with one diffracting element of the sample.

According to one embodiment, the method comprises a step e) of applying a numerical propagation operator to the resulting image, and determining a complex amplitude of a light wave to which the image sensor is exposed.

According to one embodiment, step d) comprises the following substeps:
i) obtaining a subpixelated image from each acquired image, the subpixelated image containing a number of pixels higher than the number of pixels of the acquired image, so as to obtain a stack of subpixelated images;

ii) using the movements determined in step c), aligning each subpixelated image so as to obtain a stack of subpixelated and aligned images;

iii) combining the subpixelated and aligned images in order to obtain the high-resolution image.

In substep ii), the alignment may be carried out with respect to a base image, the base image being an image taken from the stack of subpixelated images formed in substep i).

According to another embodiment, step d) comprises the following substeps:

i) using the movements determined in step c), aligning each acquired image so as to obtain a stack of aligned images;

ii) obtaining an aligned and subpixelated image from each aligned image obtained in substep i), the aligned and subpixelated image containing a number of pixels higher than the number of pixels of the aligned image, so as to obtain a stack of aligned and subpixelated images;

iii) combining the aligned and subpixelated images in order to obtain the high-resolution image.

In substep i), the alignment may be carried out with respect to a base image, the base image being an image acquired in step b).

According to one embodiment, step d) comprises the following substeps:

i) aligning each acquired image using the movement that is associated therewith, so as to obtain an aligned image from each acquired image;

ii) combining each aligned image to form the high-resolution image.

Another subject of the invention is a device for producing an image of a sample comprising:

a light source, able to illuminate the sample;

an image sensor, the sample being placed between the light source and the image sensor;

the image sensor being able to form an image, in a detection plane, of a light wave transmitted by the sample under the effect of the illumination by said light source, no magnifying optics being placed between the image sensor and the sample;

characterized in that the device also comprises:

a piezoelectric transducer able to induce a movement of the image sensor in the detection plane.

The device may also comprise a processor that is able to process a plurality of acquired images of the sample, each image being respectively associated with a position of the image sensor in the detection plane, each position being different from the next, the processor being able to implement steps c) and d) of a method such as described in this patent application.

The device may be such that the image sensor is translationally immovable along the propagation axis of the light emitted by the light source.

FIGURES

Figure 5A:
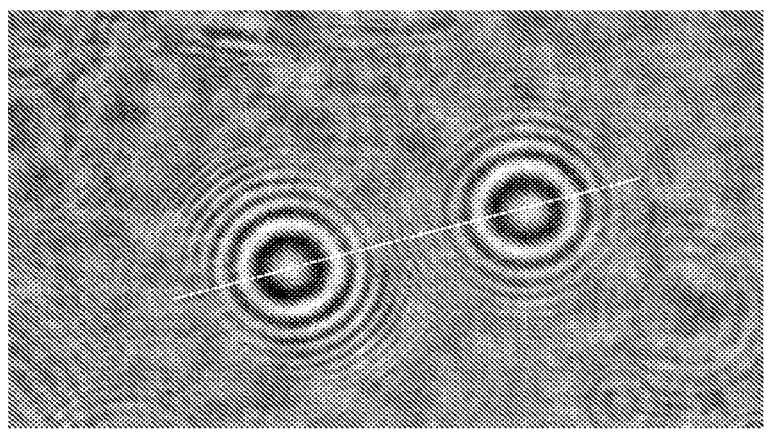
Figure 5B:
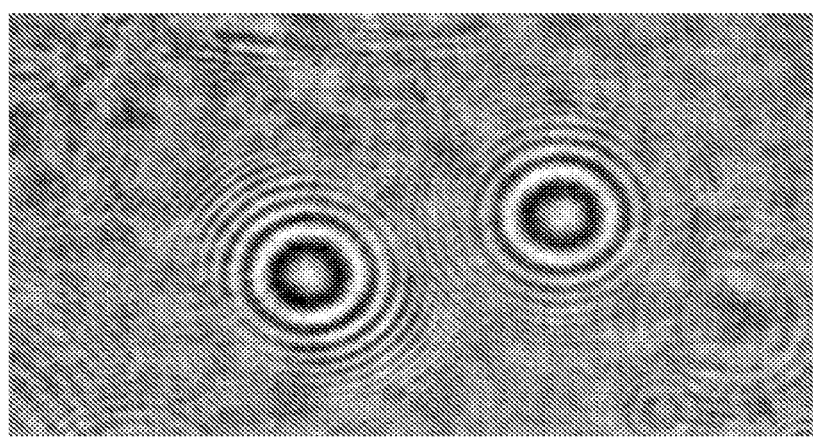
Figure 5C:
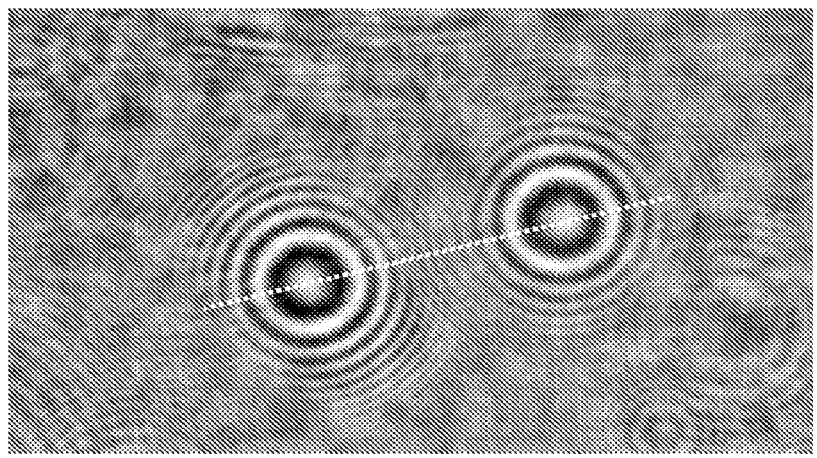

FIGS. 5A, 5B, and 5C respectively show, in relation to the first experimental trial, an acquired image, the subpixelated acquired image, and a so-called high-resolution image obtained by combining 16 subpixelated and aligned images.

Figure 6A:
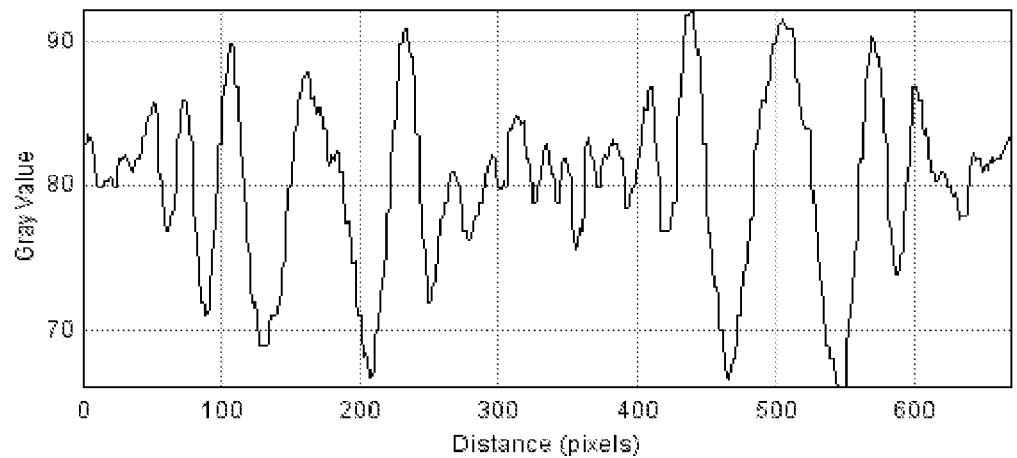
Figure 6B:
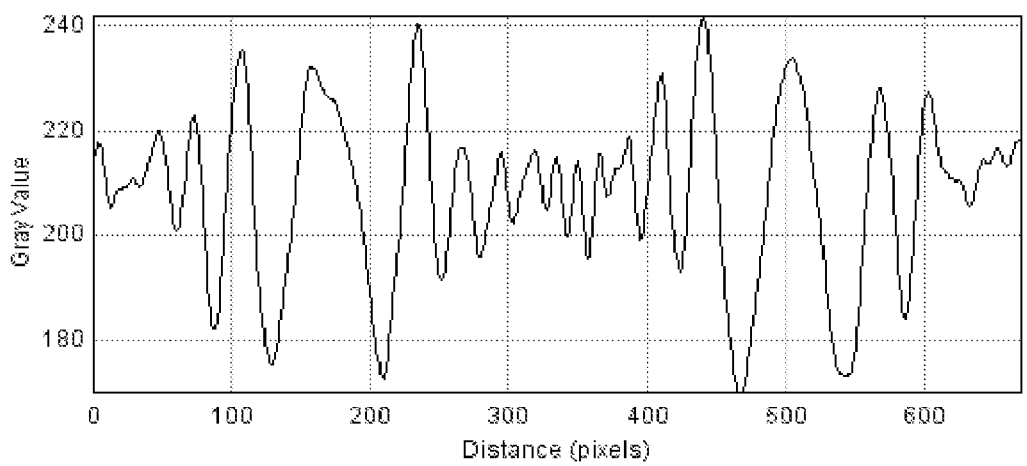

FIGS. 6A and 6B show an intensity profile of the pixels on a line drawn in FIGS. 5A and 5C, respectively.

Figure 7A:
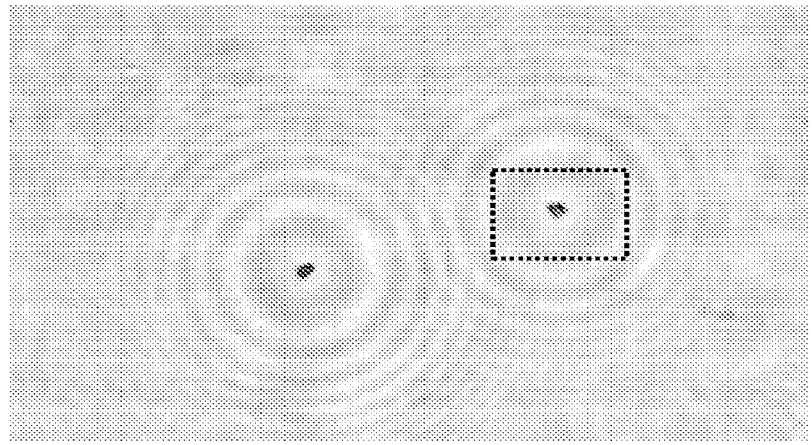
Figure 7B:
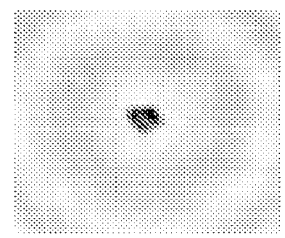

FIG. 7A is an image obtained by applying a holographic propagation operator to the image of FIG. 5A. FIG. 7B is a detail of FIG. 7A.

Figure 7C:
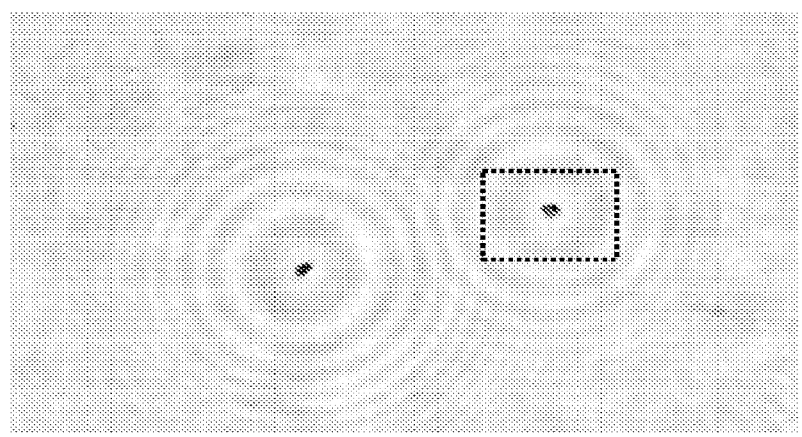
Figure 7D:
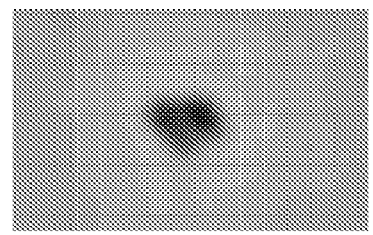

FIG. 7C is an image obtained by applying a holographic propagation operator to the image of FIG. 5C. FIG. 7D is a detail of FIG. 7C.

Figure 8A:
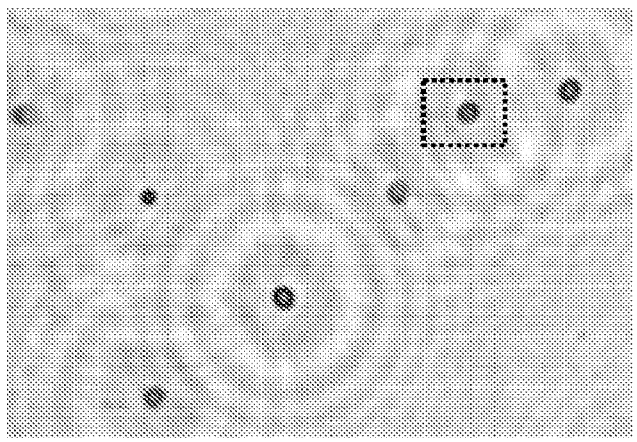
Figure 8B:
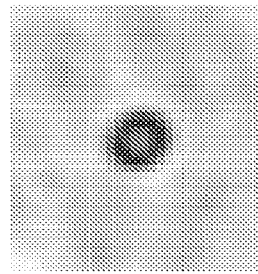
Figure 8C:
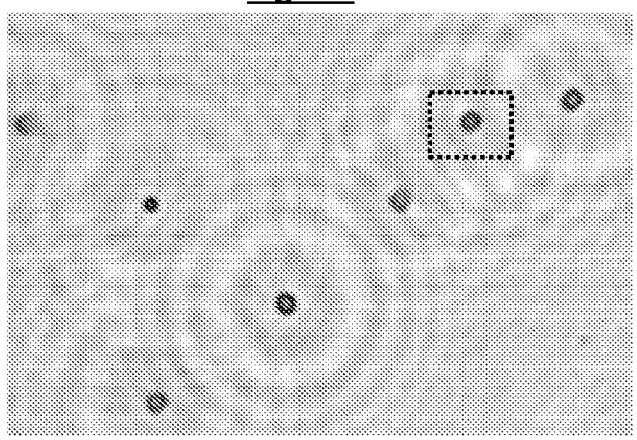
Figure 8D:
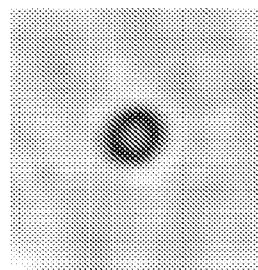
Figure 8E:
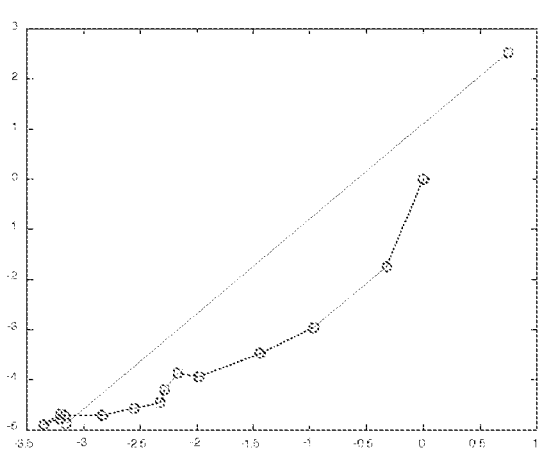

FIG. 8A is an image acquired by an image sensor during a second experimental trial. FIG. 8B is a detail of FIG. 8A. FIG. 8C is a high-resolution image formed during the second experimental trial, including the acquisition of 16 successive images. FIG. 8D is a detail of FIG. 8C. FIG. 8E shows the movement of the image sensor between each of the 16 images acquired during the second experimental trial.

DESCRIPTION OF PARTICULAR EMBODIMENTS

Figure 1:
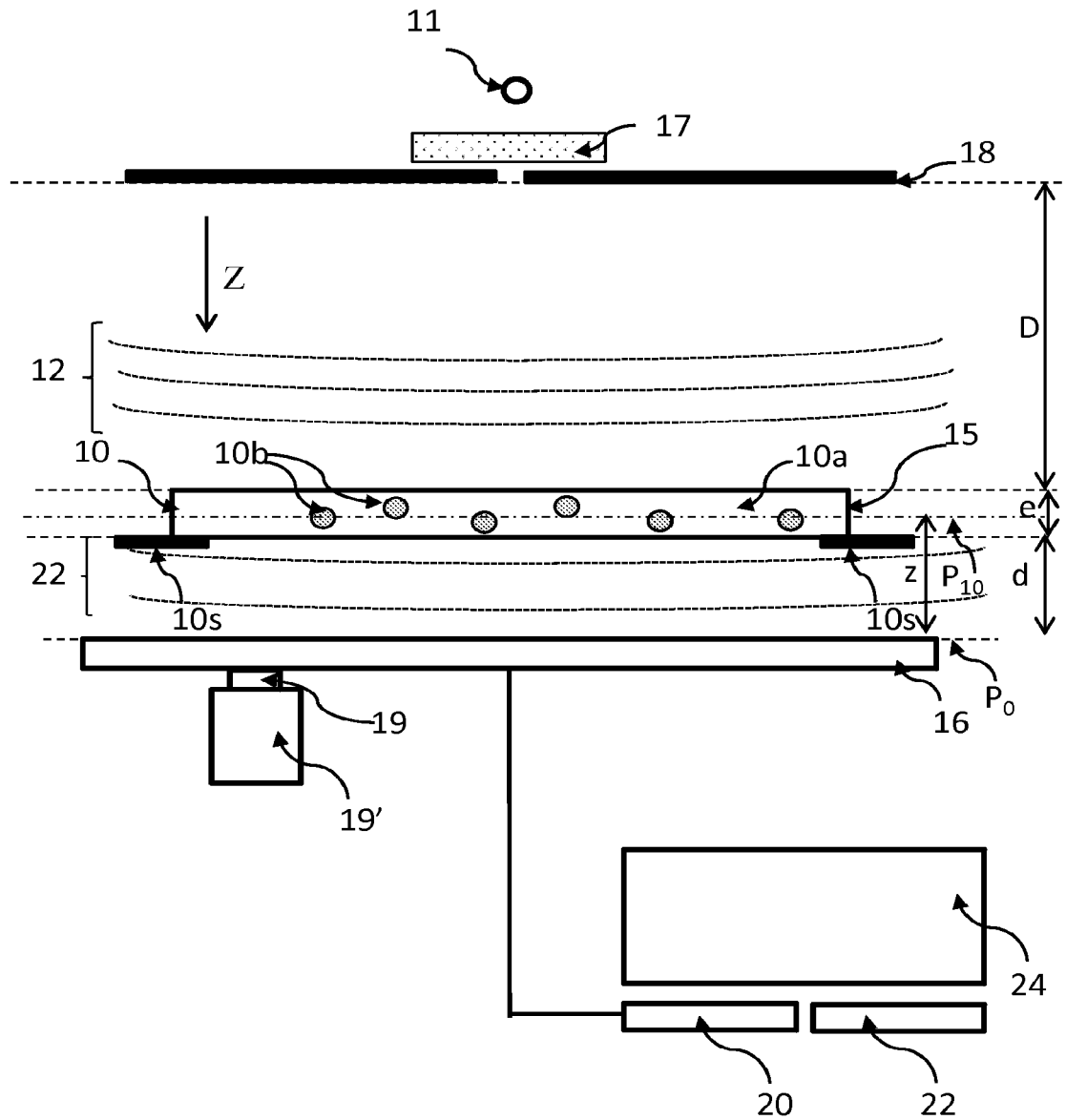
FIG. 1 shows an example of a device according to the invention.

FIG. 1 shows an example of a device according to the invention. A light source 11 is able to emit a light wave 12, called the incident light wave, that propagates in the direction of a sample 10, along a propagation axis Z. The light wave is emitted in a spectral band $\Delta\lambda$.

The sample 10 is a sample that it is desired to characterize. It may notably be a question of a medium 10a containing particles 10b. The particles 10b may be blood cells, for example red blood cells or white blood cells. It may also be a question of other cells, of microorganisms, for example bacteria or yeast, of microalgae, of microspheres, or of droplets that are insoluble in the liquid medium, lipid nanoparticles for example. Preferably, the particles 10b have a diameter, or are inscribed in a diameter, smaller than 1 mm, and preferably smaller than 100 µm. They are microparticles (diameter smaller than 1 mm) or nanoparticles (diameter smaller than 1 µm). The medium 10a, in which the particles are submerged, may be a liquid medium, for example a liquid phase of a bodily liquid, a culture medium or a liquid sampled from the environment or from an industrial process. It may also be a solid medium or a medium having the consistency of a gel, for example an agar substrate, propitious to the growth of bacterial colonies. The sample 10 may also be a tissue slide, of pathology-slide type.

The sample 10 is contained in a fluidic chamber 15. The fluidic chamber 15 is for example a microcuvette, commonly used in point-of-care type devices, in which the sample 10 penetrates, for example by capillary action. The thickness e of the sample 10, along the propagation axis, typically varies between 20 µm and 1 cm, and is preferably comprised between 50 µm and 500 µm, 100 µm for example.

The sample lies in a plane $P_{10}$, called the plane of the sample, perpendicular to the propagation axis. It is held on a holder 10s.

The distance D between the light source 11 and the sample 10 is preferably larger than 1 cm. It is preferably comprised between 2 and 30 cm. Preferably, the light source, seen from the sample, may be considered to be point-like. This means that its diameter (or its diagonal) is preferably smaller than one tenth, better still one hundredth, of the distance between the sample and the light source. Thus, preferably, the light reaches the sample in the form of plane waves, or waves that may be considered to be such.

The light source 11 may be a light-emitting diode or a laser diode. It may be associated with a diaphragm 18, or spatial filter, the use of such a spatial filter not being necessary when the light source is a laser source. The aperture of the diaphragm is typically comprised between 5 µm and 1 mm, and preferably between 50 µm and 500 µm. In this example, the diaphragm is supplied by Thorlabs under the reference P150S and its diameter is 150 µm. The diaphragm may be replaced by an optical fiber, a first end of which is placed facing the light source 11 and a second end of which is placed facing the sample 10.

The device preferably comprises a diffuser 17, placed between the light source 11 and the diaphragm 18 in particular when the light source is a light-emitting diode. The use of such a diffuser allows constraints on the centrality of the light source 11 with respect to the aperture of the diaphragm 18 to be avoided. The function of such a diffuser is to distribute the light beam produced by the elementary light source 11 over a cone of angle α, α being equal to 60° in the present case. Preferably, the diffusion angle varies between 10° and 90°.

Preferably, the spectral emission band Δλ, of the incident light wave 12 has a width smaller than 100 nm. By spectral bandwidth, what is meant is a full width at half maximum of said spectral band.

The sample 10 is placed between the light source 11 and an image sensor 16. The latter preferably lies parallel, or substantially parallel, to the plane in which the sample lies. The term substantially parallel means that the two elements may not be rigorously parallel, an angular tolerance of a few degrees, lower than 20° or 10°, being acceptable.

The image sensor 16 is able to form an image in a detection plane $P_0$. In the example shown, it is an image sensor comprising a matrix array of CCD pixels or a CMOS sensor. Each pixel is designated 16 $r$, $r$ representing a coordinate of the pixel in the detection plane. CMOS sensors are preferred, because the pixels are of smaller size, this allowing images to be acquired the spatial resolution of which is more favorable. The detection plane $P_0$ preferably lies perpendicular to the propagation axis Z of the incident light wave 12. The image sensor 16 is placed in contact with a piezoelectric module 19' allowing a piezoelectric transducer 19 to be activated, the latter being able to move, in a plane parallel to the detection plane $P_0$, when it is subjected to an electrical excitation. The movement of the piezoelectric transducer 19 causes a movement of the image sensor 16 parallel to the detection plane $P_0$.

The distance d between the sample 10 and the matrix array of pixels of the image sensor 16 is preferably comprised between 50 µm and 2 cm, and more preferably comprised between 100 µm and 2 mm. Preferably, this distance is kept constant, translation of the image sensor 16 along the propagation axis Z, i.e. perpendicular to the detection plane $P_0$, being blocked. The translational blockage may be obtained by straps that block or limit a translation of the image sensor along the axis Z.

The absence of any magnifying optics between the image sensor 16 and the sample 10 will be noted. This does not prevent focusing micro-lenses optionally being present level with each pixel of the image sensor 16, these lenses not having the function of magnifying the image acquired by the image sensor.

Under the effect of the incident light wave 12, the sample 10 may generate a diffracted wave, liable to produce, on the detection plane $P_0$, interference, in particular with a portion of the incident light wave 12 transmitted by the sample. Moreover, the sample may absorb some of the incident light wave 12. Thus, the light wave 22, transmitted by the sample, and to which the image sensor 16 is exposed, may comprise:

a component resulting from diffraction of the incident light wave 12 by the sample; and a component resulting from transmission of the incident light wave 12 by the sample.

Under the effect of the diffraction, each particle 10b present in the sample may give rise to the formation of a diffraction pattern, or hologram, in the image acquired by the image sensor 16. Such a hologram generally takes the form of a light central spot encircled by alternatively light and dark diffraction rings. The higher the spatial resolution of the hologram, the better the possibilities with respect to characterization of the particle, notably when holographic reconstruction algorithms such as described below are used.

A processor 20, for example a microprocessor, is able to process each image acquired by the image sensor 16. In particular, the processor is a microprocessor connected to a programmable memory 22 in which a sequence of instructions for carrying out the image-processing and calculating operations described in this description is stored. The processor may be coupled to a screen 24 allowing the images acquired by the image sensor 16 or calculated by the processor 20 to be displayed.

The invention is based on the observation that a single image of a sample 10 may have a spatial resolution that is insufficient for a precise characterization of the particles 10b. Just as in the method described with reference to the prior art, a plurality of images of the sample are successively acquired. However, contrary to the prior art, the relative position of the sample 10 with respect to the light source 11 is kept constant, whereas the relative position of the image sensor 16 with respect to the sample 10 varies between the acquisition of two successive images. More precisely, between each image acquisition, the piezoelectric transducer 19 is activated, so as to move the image sensor parallel to the detection plane $P_0$. The movement may be random, this allowing a simple and inexpensive piezoelectric transducer to be used, since the vector characterizing the movement in the detection plane $P_0$ may be determined as described below. Contrary to the prior art, the relative position of the analyzed sample 10 and of the light source 11 does not vary between two successive acquisitions. Thus, the same image is projected onto the detection plane $P_0$, which is not the case when the light source is moved with respect to the sample 10, or vice versa. Specifically, the inventors believe that it is preferable to carry out a plurality of acquisitions of the image projected onto the detection plane, the position of the image sensor being modified between each acquisition, so as to obtain a plurality of acquisitions of a given image projected onto the detection plane, these acquisitions being obtained with the image sensor in different positions in the detection plane. The combination of these acquisitions allows an image $I_{HR}$, called the high-resolution image, having an improved spatial resolution to be obtained.

Figure 2:
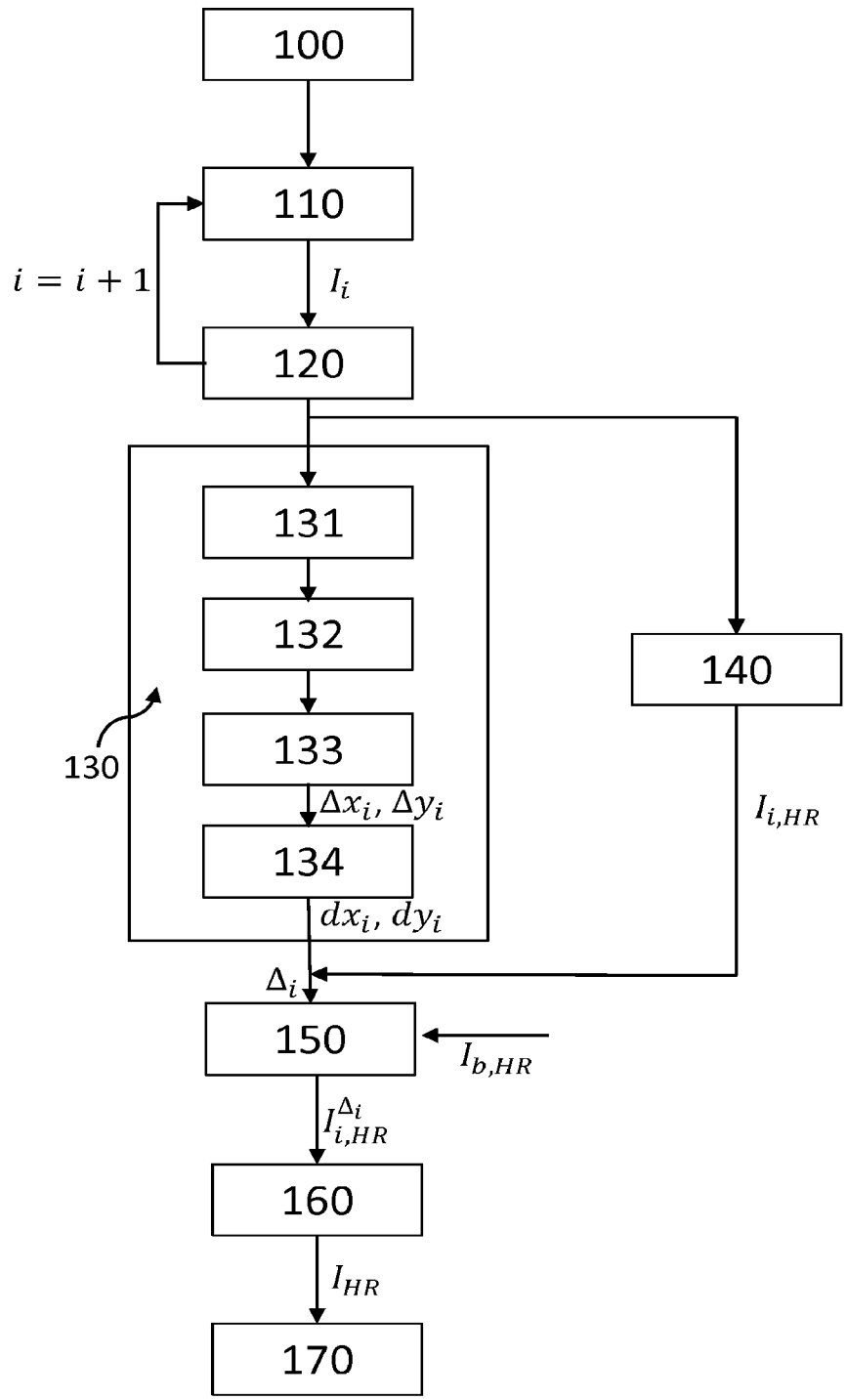
FIG. 2 shows the main steps of a method according to the invention.

The main steps of a formation of the high-resolution image are described below, with reference to FIG. 2:

Step 100:

Initialization; illumination of the sample 10 with the matrix-array sensor placed in an initial position $(x_0, y_0)$ in the detection plane $P_0$. The initial position of the image sensor corresponds to a position of a reference point of this sensor, for example the position of one pixel. It may for example be a position of the center of the image sensor, or of one of its edges.

Step 110:

Acquisition of an image. In the first iteration, an initial image $I_{i=0}$ associated with the initial position $(x_{i=0}, y_{i=0})$ of the image sensor is acquired in the detection plane.

Step 120:

Provided that a criterion for exiting the iterations has not been met, pulsed activation of the piezoelectric transducer 19, so as to modify the position of the image sensor in the detection plane, the latter passing from a position $(x_i, y_i)$ to a position $(x_{i+1}, y_{i+1})$ and repetition of step 110 with update of the index of iteration i. The latter is an integer. Once the criterion for exiting the iterations is met, step 130 is passed to. The criterion for exiting the iterations is for example a preset number $N_i$ of acquired images. Step 120 allows a stack of acquired images $I_i$ to be obtained, with $2 \leq i \leq N_i$. The number of acquired images may vary between 2 and 20. The expression "pulsed activation" means a brief activation, the duration of which is generally shorter than 1 second, and typically of about a few tens of milliseconds, followed by a period of rest in which an image may be acquired.

Figure 3A:
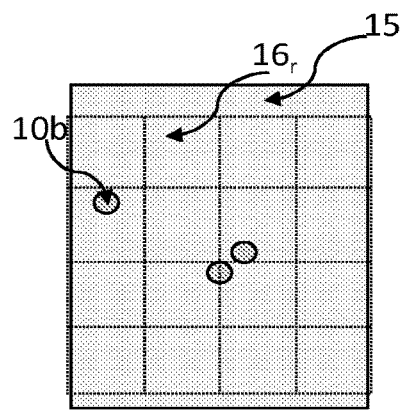
FIGS. 3A, 3B and 3C show three successive positions of the image sensor with respect to a sample.
Figure 3B:
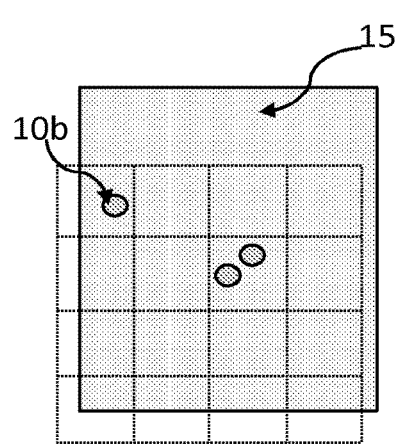
Figure 3C:
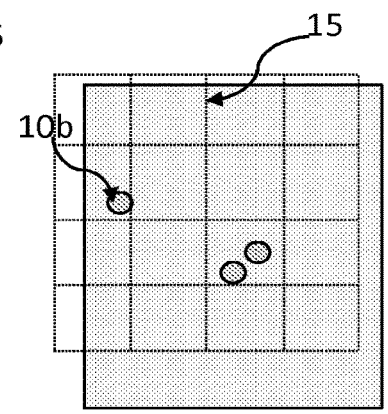

FIGS. 3A, 3B and 3C show three different positions of the image sensor 16 with respect to a sample 10 containing three particles 10b. Because the light source is immobile with respect to the sample, the image projected into the detection plane is rigorously identical: the projection of each particle into the detection plane remains stationary. In these figures, the image sensor has been represented by a grid delineating the pixels 16r of the sensor. The movement of the sensor makes it possible to make the projection of each particle 10b, along the propagation axis Z, vary with respect to the image sensor 16. Thus, the relative position of each particle with respect to one pixel of the detector is modified on each movement of the image sensor.

The movement of the sensor, between two successive images, is preferably smaller than 5 pixels, or than 10 pixels. The useful field of observation, corresponding to the stack of acquired images, is the intersection of the field of observation of each image. Thus, the limitation of the movement of the sensor to a few pixels allows the field of observation to be maximized.

Step 130:

Estimation of the movement $\Delta_i$ of each image $I_i$ with respect to a reference image $I_{ref-i}$. The reference image $I_{ref-i}$ may, for example, be the initial image $I_0$ or the image $I_{i-1}$ acquired before each image $I_i$. With the reference image is associated a reference position $(x_{ref-i}, y_{ref-i})$ of the image sensor 16. The reference image $I_{ref-i}$ may be the same for each acquired image, in which case it is denoted $I_{ref}$. Each movement is calculated with respect to the same reference position, such that $(x_{ref-i}, y_{ref-i}) = (x_{ref}, y_{ref})$. It has been observed that the results are optimal when, for each image $I_i$, the reference image $I_{ref-i}$ is the initial image $I_0$. In other words, when $I_{ref} = I_0$.

The movement $\Delta_i$ of an image $I_i$ is a vector the coordinates of which represent a movement between the reference image $I_{ref-i}$ and the acquired image $I_i$, and more particularly a translation in the detection plane.

A plurality of methods are known for estimating the movement of two images with respect to each other. In the case where the movement is restricted to a translation in a plane, the inventors have implemented a method based on a ratio between the Fourier transforms of the acquired image $I_i$ in question and of the reference image $I_{ref-i}$, so as to estimate a movement by an integer number of pixels, this being followed by an estimation of a so-called subpixel movement smaller than the size of one pixel. Step 130 then comprises the following substeps:

Substep 131: calculation of the Fourier transforms of the acquired image $I_i$ and reference image $I_{ref-i}$.

Substep 132: calculation, term by term, of a product of the two Fourier transforms calculated in substep 131, so as to obtain a resulting image $I_{i/ref-i}$ such that:

$$I_{i/ref-i} = \frac{FT(I_i)FT^*(I_{ref-i})}{\|FT(I_i)FT^*(I_{ref-i})\|}$$

where FT represents the Fourier transform operator, the latter for example being calculated using a fast Fourier transform (FFT) algorithm, and FT* represents the operator returning the conjugate Fourier transform.

Substep 133: calculation of an inverse Fourier transform of the resulting image $I_{i/ref\_i}$ obtained in the preceding substep. An image the maximum intensity of which corresponds to a point $(\Delta x_i, \Delta y_i)$ is obtained, $\Delta x_i$ and $\Delta y_i$ being the coordinates of the vector representing the sought movement $\Delta_i$ by an integer number of pixels in the two directions of the detection plane $P_0$. $\Delta x_i$ and $\Delta y_i$ are integers. Thus, seeking the point of maximum intensity in the image, obtained by inverse Fourier transform of the resulting image $I_{i/ref-i}$, allows the integer coordinates $\Delta x_i$ and $\Delta y_i$ of the sought movement $\Delta_i$ to be obtained.

Substep 134: estimation of the subpixel movement. The movement $\Delta_i$ may comprise a non-integer component, expressing the movement, called the subpixel movement, of the acquired image $I_i$ in a non-integer number of pixels lower than 1. The quantities $dx_i$ and $dy_i$ respectively designate a subpixel movement in one of the two directions of the detection plane $P_0$.

The acquired image $I_i$ may be corrected using the integer coordinates $\Delta x_i$ and $\Delta y_i$ determined in substep 133, so as to form an intermediate image $I_i^{\Delta x_i \Delta y_i}$ corrected for the movement by $\Delta x_i$ and $\Delta y_i$: $I_i^{\Delta x_i \Delta y_i}(x, y) = I_i(x - \Delta x_i; y - \Delta y_i)$.

If $I_i^{\Delta_i}$ is the image corrected for the movement $\Delta_i$, where $\Delta_i = (\Delta x_i + dx_i; \Delta y_i + dy_i)$, assuming subpixel movements $dx_i$ and $dy_i$ allows a linear relationship between the intermediate image $I_i^{\Delta x_i \Delta y_i}$ and the corrected image $I_i^{\Delta_i}$ to be obtained, such that:

$$I_i^{\Delta_i}(x, y) = I_i^{\Delta x_i \Delta y_i}(x + dx_i, y + dy_i)$$

$$I_i^{\Delta_i}(x, y) = I_i^{\Delta x_i \Delta y_i}(x, y) + dx * \frac{dI_i^{\Delta x_i \Delta y_i}}{dx}(x, y) + dy * \frac{dI_i^{\Delta x_i \Delta y_i}}{dy}(x, y)$$

The error $E_i(dx, dy)$ between the images $I_i^{\Delta x_i \Delta y_i}$ and $I_i^{\Delta_i}$ may be written:

$$E_i(dx, dy) = \int \left( I_i^{\Delta_i}(x, y) - I_i^{\Delta x_i \Delta y_i}(x, y) - dx * \frac{dI_i^{\Delta x_i \Delta y_i}}{dx}(x, y) - dy * \frac{dI_i^{\Delta x_i \Delta y_i}}{dx}(x, y) \right)^2 dxdy$$

The values $dx_i$ and $dy_i$ that minimize $E_i(dx, dy)$ may be estimated, with $$\frac{dE}{dx}(dx_i, dy_i) = 0$$

and

-continued $$\frac{dE}{dy}(dx_i, dy_i) = 0$$

The estimation of $dx_i$ and $dy_i$ allows the movement $\Delta_i = (\Delta x_i + dx_i; \Delta y_i + dy_i)$ to be obtained.

Step 134 is optional. When it is not implemented, the movement $\Delta_i$ is obtained using the integer coordinates $\Delta x_i$ and $\Delta y_i$ obtained following substep 133.

Substeps 131 to 134 are repeated for each acquired image $I_i$, the reference image $I_{ref\_i}$ possibly for example being the initial image $I_0$, this being the preferred configuration, or an image $I_{i-1}$ acquired beforehand.

Figure 4:
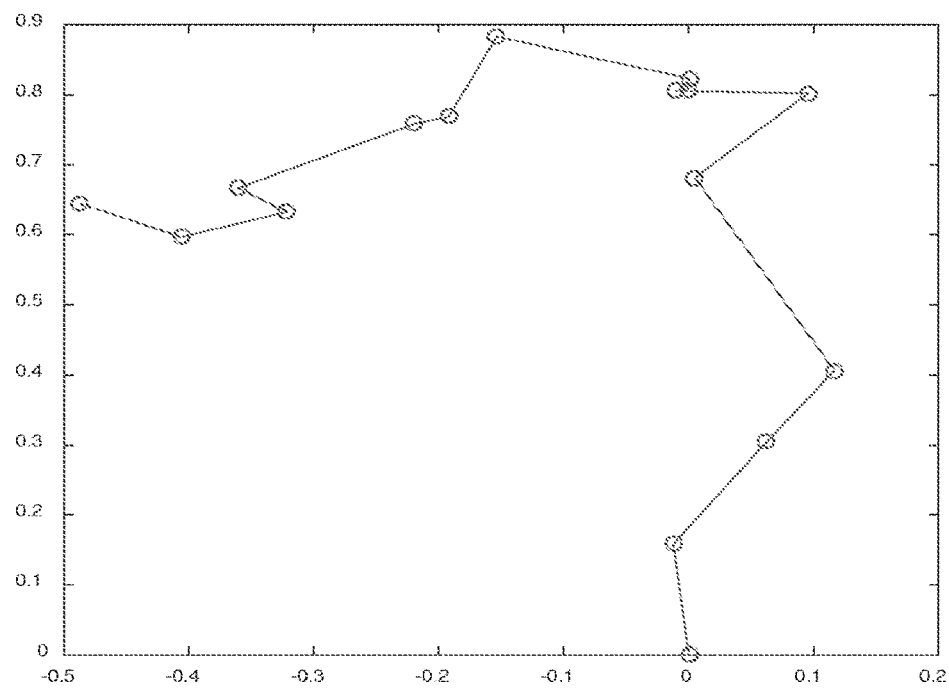
FIG. 4 illustrates the successive movements of the image sensor during a first experimental trial.

FIG. 4 shows the successive movements $\Delta_i$ of a stack of 16 images, the position (0,0) corresponding to the coordinate of the initial image $I_0$. The abscissa and ordinate axes respectively represent the coordinates of each movement $\Delta_i$ along the X- and Y-axes defining a base of the detection plane $P_0$.

Step 140:

subpixelation. Each acquired image $I_i$ is subpixelated, for example by a factor comprised between 2 and 10. To do this, from each acquired image $I_i$, an image, called the subpixelated image $I_{i,HR}$, containing more pixels than the acquired image $I_i$, is determined. The subpixelated image $I_{i,HR}$ may be obtained by dividing each pixel of the acquired image $I_i$ into $N^2$ subpixels, N being an integer higher than 1. N may for example be equal to 4, this allowing a subpixelated image $I_{i,HR}$ containing 16 times more pixels than the acquired image $I_i$ to be obtained. The value of the pixels of the subpixelated image is calculated by interpolation, for example bilinear or bicubic interpolation, bicubic interpolation being preferred. A stack of subpixelated images $I_{i,HR}$ is thus obtained.

FIG. 5A shows an acquired image $I_i$. FIG. 5B shows an example of a subpixelated image $I_{i,HR}$ corresponding to the acquired image shown in FIG. 5A. These images are described more precisely in the rest of the description.

Step 150:

alignment. Each subpixelated image is aligned with a subpixelated image, called the base image $I_{b,HR}$, of the stack of subpixelated images. The base image is for example the acquired and subpixelated initial image, in which case $I_{b,HR} = I_{i=0,HR}$. Each subpixelated image $I_{i,HR}$ is then aligned with the base image, by taking into account the movement $\Delta_i$ associated with the acquired image $I_i$, i.e. the movement determined in step 130. Thus a stack of subpixelated and aligned images, which images are denoted $I_{i,HR}^{\Delta_i}$, is obtained.

The base image $I_{b,HR}$ used for the alignment is the same for each image $I_{i,HR}$ of the stack of subpixelated images. It may be the initial image (i=0) or the final image (i=$N_i$) or an image acquired when the image sensor is positioned in a particular position.

Steps 140 and 150 may be inverted, the alignment being carried out with respect to a base image $I_b$ before the subpixelation, so as to obtain a stack of aligned images $I_i^{\Delta_i}$. Each aligned image is then subpixelated to form a stack of subpixelated and aligned images, which images are denoted $I_{i,HR}^{\Delta_i}$. However, the inventors believe that it is preferable to carry out the alignment after the subpixelation.

Step 160:

combination of the subpixelated and aligned images $I_{i,HR}^{\Delta_i}$, so as to obtain a high-resolution image $I_{HR}$. The high-resolution image is obtained via an arithmetic combination of the subpixelated and aligned images $I_{i,HR}^{\Delta_i}$, for example taking the form of a mean, according to the expression:

$$I_{HR} = \text{mean}(I_{i,HR}^{\Delta_i})$$

If each acquired image contains Nx×Ny pixels, the high-resolution image contains $N^2 \times Nx \times Ny$ pixels.

The high-resolution image $I_{HR}$ has a spatial resolution higher than each of the $N_i$ acquired images. This image is used to characterize the particles 10b present in the sample. FIG. 5C shows such an image.

Step 170:

characterization. The sample may be characterized on the basis of the elementary diffraction patterns generated thereby. When the sample contains diffracting particles 10b, they may be characterized on the basis of the diffraction patterns associated with each particle, as they appear in the high-resolution image $I_{HR}$. Such a characterization may be carried out directly on the basis of each elementary diffraction pattern, for example by morphological analysis, or by applying a numerical reconstruction algorithm to the high-resolution image $I_{HR}$, as described below.

As described with reference to the prior art, it is possible to apply, to each image $I_i$ acquired by the image sensor 16, or to the high-resolution image $I_{HR}$ described above, a propagation operator h, so as to calculate a quantity representative of the light wave 22 transmitted by the sample 10, and to which the image sensor 16 is exposed. Such a method, which is said to be a holographic-reconstruction method, notably allows an image of the modulus or of the phase of the light wave 22 to which the image sensor is exposed to be reconstructed in a reconstruction plane parallel to the detection plane $P_0$, and notably in the plane $P_{10}$ in which the sample lies. To do this, the image in question is convoluted with a propagation operator h. It is then possible to reconstruct a complex expression A for the light wave 22 at any point in space of coordinates (x, y, z), and in particular in a reconstruction plane $P_z$ located at a distance $|z|$ from the image sensor 16, this reconstruction plane possibly being the plane $P_{10}$ of the sample. The complex expression A is a complex quantity the argument and the modulus of which are respectively representative of the phase and intensity of the light wave 22 to which the image sensor 16 is exposed. The convolution with the propagation operator h allows a complex image $A_z$ representing a spatial distribution of the complex expression A in a plane, called the reconstruction plane $P_z$, lying at a coordinate z from the detection plane $P_0$, to be obtained. In this example, the detection plane $P_0$ has as equation z=0. The complex image $A_z$ corresponds to a complex image of the sample in the reconstruction plane $P_z$. It also represents a two-dimensional spatial distribution of the optical properties of the wave 22 to which the image sensor 16 is exposed.

The function of the propagation operator h is to describe the propagation of light between the image sensor 16 and a point of coordinates (x, y, z), which point is located at a distance $|z|$ from the image sensor. It is then possible to determine the modulus $M(x, y, z)$ and/or the phase $\varphi(x, y, z)$ of the light wave 22, at this distance $|z|$, which is called the reconstruction distance, with:

$$M(x,y,z) = \text{abs}[A(x,y,z)]$$

$$\varphi(x,y,z) = \text{arg}[A(x,y,z)]$$

The operators abs and arg are the modulus and argument, respectively.

In other words, the complex amplitude A of the light wave 22 at any point in space of coordinates (x, y, z) is such that: $A(x, y, z) = M(x, y, z)e^{j\varphi(x, y, z)}$. On the basis of such reconstructions, it is notably possible to form what are called reconstructed images, of the modulus (modulus image or amplitude image) or the phase (phase image), respectively from the modulus M(x, y, z) and phase φ(x, y, z) reconstructed at a given distance Z.

Experimental trials have been carried out using a sample containing water, in which silica particles of 3 µm and 6 µm diameter were submerged. The sample is a fluidic chamber of 100 µm thickness.

The main experimental parameters were the following:
light source: CivilLaser laser diode centered on 405 nm;
VFU-J003-MB 8-bit CMOS sensor, 3884×2764 square pixels of 1.67 µm side length;
piezoelectric module: Kingstate KMTG1303-1 buzzer, stops being placed in order to oppose a movement of the sensor along the axis Z;
distance between the light source and the sample: 8 cm;
distance between the sample and the image sensor: 1.5 mm.

The algorithm described with reference to steps 100 to 170 was applied so as to obtain 16 acquired images $I_i$ and to form one high-resolution image $I_{HR}$. FIG. 4 shows each movement $\delta_i$ between the acquisition of two successive images $I_{i-1}$, $I_i$.

FIGS. 5A, 5B and 5C respectively show an acquired image $I_i$, a subpixelated image $I_{i,HR}$ resulting from the image shown in FIG. 5A, and the high-resolution image $I_{HR}$ obtained at the end of the process. Two diffraction patterns may be clearly seen in the central portion of these images.

FIGS. 6A and 6B show the profile of the intensity of the pixels of the images shown in FIGS. 5A and 5C, each profile being that along the dotted white line shown in said images, respectively. The abscissa axis represents the pixel number whereas the ordinate axis represents the value of the intensity of each pixel. The standard deviation of each profile was calculated. The values obtained are 5.1 and 14 for FIGS. 6A and 6B, respectively. The profile of FIG. 6B, which is that of the high-resolution image, has a higher dispersion with respect to the average of the image, this indicating that the diffraction rings of each diffraction pattern are better defined.

FIGS. 7A and 7C illustrate images of the modulus M(x, y, z) of the amplitude A(x, y, z) reconstructed in a plane $P_{10}$ parallel to the detection plane $P_0$ and through which the sample 10 passes, these images being based on the images shown in FIGS. 5A and 5C, respectively. These reconstructed images were obtained by implementing the reconstruction algorithm described above, with z=1.16 mm. The propagation operator is, in this example, the Fresnel-Helmholtz function, such that:

$$h(x, y, z) = \frac{1}{j\lambda z} e^{j 2\pi \frac{z}{\lambda}} \exp\left(j\pi \frac{x^2 + y^2}{\lambda z}\right)$$

where x, y are coordinates in a plane perpendicular to the propagation axis Z, i.e. in the detection plane $P_0$ or in the plane $P_{10}$ of the sample and λ is a wavelength, for example the central wavelength, of the spectral band Δλ. Other more refined reconstruction methods may be implemented, for example those described in patent application FR 1652500, filed 23 Mar. 2016.

FIG. 7A shows the result of a reconstruction based on an image $I_i$ acquired by the image sensor. It is an example representative of the prior art. FIG. 7C shows the result of a reconstruction based on a high-resolution image $I_{HR}$ obtained according to the invention. FIGS. 7B and 7D are zooms of regions of interest framed by a black rectangle in FIGS. 7A and 7C, respectively. The object shown is an agglomeration of two spheres of 6 µm diameter and a small sphere of 3 µm diameter. The image reconstructed on the basis of the high-resolution image $I_{HR}$ has a sufficient spatial resolution to allow the three spheres (see FIG. 7D) to be distinguished, this not being the case for the image reconstructed on the basis of the image $I_i$ acquired by the image sensor 16 (see FIG. 7B).

Other trials have been carried out using a sample containing blood. Total blood was subjected to a Dextran-based treatment in order to aggregate red blood cells. After sedimentation of the latter, the supernatant, containing white blood cells, was collected, then diluted to 1:10 in a phosphate-buffered saline (PBS) saline buffer. The light source was a 4-colour Cree light-emitting diode of reference XLamp MCE Color (white, not used—blue, 450 nm—green, 520 nm—red, 620 nm). This diode comprised 4 elementary diodes, only the elementary diode emitting in the blue being used in this trial. FIGS. 8A, 8C and 8E respectively show:
an image of the modulus M(x, y, z) of the complex amplitude A(x, y, z) reconstructed in the plane $P_{10}$ of the sample, obtained from an image $I_i$ acquired by the image sensor;
an image of the modulus M(x, y, z) of the complex amplitude A(x, y, z) reconstructed in the plane $P_{10}$ of the sample, obtained from a high-resolution image $I_{HR}$ obtained by applying steps 100 to 160;
the movement $\Delta_i$ between the acquisition of two successive $I_{i-1}$, $I_i$, images the format employed being similar to that of FIG. 4.

In FIGS. 8A and 8C, dark spots correspond to white blood cells. FIGS. 8B and 8D are details of a region of interest framed by a box in FIGS. 8A and 8C, respectively. This allows the improvement in spatial resolution achieved with the invention to be appreciated. FIG. 8D, which was obtained by reconstruction on the basis of a high-resolution image, has an improved spatial resolution with respect to FIG. 8B.

The invention will possibly be employed in the field of biology or health, but also in environmental inspection, food processing or other industrial processes.

The invention claimed is:

1. A method for forming an image of a sample comprising:
    a) illuminating the sample with a light source;
    b) acquiring a plurality of images of the sample using an image sensor, the sample being placed between the light source and the image sensor, such that:
    the sample is immobile with respect to the light source between each acquisition;
    no magnifying optics are placed between the sample and the image sensor;
    the image sensor lies in a detection plane, the image sensor being moved, in the detection plane, between two successive acquisitions while the sample is immobile; and
    each acquired image is respectively associated with a position of the image sensor in the detection plane, each position being different from the next, each acquired image having a field of observation, each acquired image containing pixels;

c) calculating a movement of each acquired image with respect to a reference image in which the image sensor occupies a reference position; and d) forming a high-resolution image, from the acquired images and the movement calculated for each thereof, the high-resolution image having a field of observation corresponding to an intersection of the fields of observation of each acquired image, the high-resolution image containing more pixels than each acquired image, wherein the image sensor is blocked from moving in a direction perpendicular to the detection plane.

2. The method of claim 1, wherein the image sensor is securely fastened to a piezoelectric transducer, the movement of the image sensor being generated by activation of the piezoelectric transducer.

3. The method of claim 1, wherein the movement of the image sensor between two successive positions is random.

4. The method of claim 1, wherein d) comprises:
i) obtaining a stack of subpixelated images, each subpixelated image being obtained from an acquired image, the subpixelated image containing a number of pixels higher than the number of pixels of the acquired image;
ii) using the movements determined in c), aligning each subpixelated image so as to obtain a stack of subpixelated and aligned images; and
iii) combining the subpixelated and aligned images in order to obtain the high-resolution image.

5. The method of claim 1, wherein d) comprises:
i) using the movements determined in c), aligning each acquired image so as to obtain a stack of aligned images;
ii) obtaining an aligned and subpixelated image from each aligned image obtained in i), the aligned and subpixelated image containing a number of pixels higher than the number of pixels of the aligned image, so as to obtain a stack of aligned and subpixelated images; and
iii) combining the aligned and subpixelated images in order to obtain the high-resolution image.

6. The method of claim 1, wherein d) comprises:
i) aligning each acquired image using the movement that is associated therewith, so as to obtain an aligned image from each acquired image; and
ii) combining each aligned image to form the high-resolution image.

7. The method of claim 1, wherein the maximum value of the movement between two successive acquired images is 5 times or 10 times the distance between two adjacent pixels.

8. The method of claim 1, comprising:
e) applying a numerical propagation operator to the resulting image and determining a complex amplitude of a light wave to which the image sensor is exposed.

9. A device for producing an image of a sample comprising:
a light source configured to illuminate the sample;
an image sensor;
the device being configured so that the sample is placed between the light source and the image sensor, no magnifying optics being placed between the sample and the image sensor;
the image sensor being configured to acquire an image, in a detection plane, of a light wave transmitted by the sample when illuminated by the light source;
the device further comprising:
a piezoelectric transducer that is connected to the image sensor and able to induce a movement of the image sensor in the detection plane without moving the sample; and
a processor, configured to process a plurality of images, acquired by the image sensor, of the sample, each acquired image being respectively associated with a position of the image sensor in the detection plane, each position being different from the next; and
a strap that blocks the image sensor from moving in a direction perpendicular to the detection plane
the processor being configured to implement c) and d) of the method of claim 1.

* * * * *